United States Patent
Chang et al.

(10) Patent No.: US 11,671,334 B2
(45) Date of Patent: Jun. 6, 2023

(54) AVATAR REPRESENTATION OF USERS WITHIN PROXIMITY USING APPROVED AVATARS

(71) Applicant: Intel Corporation, Santa Clara, CA (US)

(72) Inventors: Gene M. Chang, Louisville, KY (US); Charlie D. Lenahan, New Albany, IN (US); Marc A. Funston, Louisville, KY (US)

(73) Assignee: Intel Corporation, Santa Clara, CA (US)

( * ) Notice: Subject to any disclaimer, the term of this patent is extended or adjusted under 35 U.S.C. 154(b) by 68 days.

(21) Appl. No.: 16/242,807

(22) Filed: Jan. 8, 2019

(65) Prior Publication Data

US 2019/0149432 A1 May 16, 2019

Related U.S. Application Data

(63) Continuation of application No. 13/727,364, filed on Dec. 26, 2012, now Pat. No. 10,212,046.

(Continued)

(51) Int. Cl.
*H04L 41/22* (2022.01)
*H04W 12/02* (2009.01)
(Continued)

(52) U.S. Cl.
CPC ............ *H04L 41/22* (2013.01); *H04L 63/102* (2013.01); *H04L 63/107* (2013.01);
(Continued)

(58) Field of Classification Search
CPC ..... H04L 67/18; H04L 63/107; H04L 63/102; H04L 67/38; H04L 41/22; H04W 12/02;
(Continued)

(56) References Cited

U.S. PATENT DOCUMENTS 6,341,316 B1   1/2002   Kloba et al.
6,772,195 B1   8/2004   Hatlelid et al.
(Continued)

FOREIGN PATENT DOCUMENTS

| EP | 2893458 B1 | 5/2018 | |
| KR | 20050004060 A * | 1/2005 | ........... G06F 16/289 |
| WO | WO-2014039150 | 3/2014 | |

OTHER PUBLICATIONS

"U.S. Appl. No. 13/727,364, Advisory Action dated Sep. 22, 2017", 4 pgs.

(Continued)

*Primary Examiner* — Mohamed A. Wasel
*Assistant Examiner* — John Fan
(74) *Attorney, Agent, or Firm* — Schwegman Lundberg & Woessner, P.A.

(57) ABSTRACT

Systems, methods, and apparatuses are directed to facilitating avatar representation of users within proximity using approved avatars. In one embodiment, logic may be configured to determine communication devices that are within a proximity threshold. The determined communication devices may include first and second communication devices that are associated with first and second users, respectively. The first user may be associated with a first avatar and the second user may be associated with a second avatar. The logic may also be configured to determine a request initiated at the first communication device for avatar information associated with one or more users of the determined communication devices. The logic may further be configured to provide the second avatar to the first user via the first communication device based on determining that the second avatar is included in an approved avatar set.

17 Claims, 8 Drawing Sheets

Related U.S. Application Data

(60) Provisional application No. 61/697,473, filed on Sep. 6, 2012.

(51) Int. Cl.

| | | |
|---|---|---|
| *H04L 9/40* | (2022.01) | |
| *H04W 4/02* | (2018.01) | |
| *H04W 12/12* | (2021.01) | |
| *H04W 12/64* | (2021.01) | |
| *H04L 67/52* | (2022.01) | |
| *H04L 67/131* | (2022.01) | |

(52) U.S. Cl.
CPC ............ *H04L 67/131* (2022.05); *H04L 67/52* (2022.05); *H04W 4/023* (2013.01); *H04W 12/02* (2013.01); *H04W 12/12* (2013.01); *H04W 12/64* (2021.01)

(58) Field of Classification Search
CPC ................. H04W 12/12; H04W 4/023; H04W 12/00503
USPC ....................................................... 709/217
See application file for complete search history.

(56) References Cited

U.S. PATENT DOCUMENTS

| | | | |
|---|---|---|---|
| 2003/0177187 A1 | 9/2003 | Levine et al. | |
| 2006/0145944 A1* | 7/2006 | Tarlton .............. | H04M 1/72427 345/2.3 |
| 2009/0138943 A1 | 5/2009 | Kawanaka | |
| 2009/0181653 A1 | 7/2009 | Alharayeri | |
| 2009/0254868 A1 | 10/2009 | Bokor et al. | |
| 2009/0318224 A1 | 12/2009 | Ealey | |
| 2010/0018382 A1 | 1/2010 | Feeney | |
| 2010/0153722 A1 | 6/2010 | Bauchot et al. | |
| 2011/0298827 A1* | 12/2011 | Perez ..................... | G06V 40/28 345/647 |
| 2012/0064971 A1 | 3/2012 | Devine et al. | |
| 2013/0073957 A1* | 3/2013 | DiGiantomasso ..... | G06Q 10/06 715/705 |
| 2013/0096906 A1* | 4/2013 | Niemeyer ............... | G06F 9/455 703/23 |
| 2013/0174223 A1* | 7/2013 | Dykeman ............... | G06F 21/10 726/4 |
| 2013/0344942 A1* | 12/2013 | Price ................... | G07F 17/3237 463/25 |
| 2014/0068462 A1 | 3/2014 | Chang et al. | |

OTHER PUBLICATIONS

"U.S. Appl. No. 13/727,364, Advisory Action dated Sep. 29, 2016", 3 pgs.
"U.S. Appl. No. 13/727,364, Advisory Action dated Nov. 25, 2015", 3 pgs.
"U.S. Appl. No. 13/727,364, Amendment filed Oct. 19, 2017", 11 pgs.
"U.S. Appl. No. 13/727,364, Corrected Notice of Allowability dated Nov. 28, 2018", 3 pgs.
"U.S. Appl. No. 13/727,364, Examiner Interview Summary dated Oct. 3, 2016", 3 pgs.
"U.S. Appl. No. 13/727,364, Final Office Action dated May 19, 2017", 18 pgs.
"U.S. Appl. No. 13/727,364, Final Office Action dated Jun. 8, 2016", 17 pgs.
"U.S. Appl. No. 13/727,364, Final Office Action dated Jul. 12, 2018", 17 pgs.
"U.S. Appl. No. 13/727,364, Final Office Action dated Sep. 10, 2015", 18 pgs.
"U.S. Appl. No. 13/727,364, Non Final Office Action dated Jan. 4, 2016", 16 pgs.
"U.S. Appl. No. 13/727,364, Non Final Office Action dated Jan. 11, 2018", 16 pgs.
"U.S. Appl. No. 13/727,364, Non Final Office Action dated May 26, 2015", 15 pgs.
"U.S. Appl. No. 13/727,364, Non Final Office Action dated Nov. 17, 2016", 18 pgs.
"U.S. Appl. No. 13/727,364, Notice of Allowance dated Oct. 3, 2018", 8 pgs.
"U.S. Appl. No. 13/727,364, Response filed Feb. 17, 2017 to Non Final Office Action dated Nov. 17, 2016", 11 pgs.
"U.S. Appl. No. 13/727,364, Response filed Apr. 4, 2016 to Non Final Office Action dated Jan. 4, 2016", 11 pgs.
"U.S. Appl. No. 13/727,364, Response filed Apr. 10, 2018 to Non Final Office Action dated Jan. 11, 2018", 11 pgs.
"U.S. Appl. No. 13/727,364, Response filed Aug. 10, 2017 to Final Office Action dated May 19, 2017", 10 pgs.
"U.S. Appl. No. 13/727,364, Response filed Aug. 18, 2017 to Final Office Action dated May 19, 2017", 10 pgs.
"U.S. Appl. No. 13/727,364, Response filed Aug. 26, 2015 to Non Final Office Action dated May 26, 2015", 10 pgs.
"U.S. Appl. No. 13/727,364, Response filed Sep. 8, 2016 to Final Office Action dated Jun. 8, 2016", 11 pgs.
"U.S. Appl. No. 13/727,364, Response Filed Sep. 11, 2018 to Final Office Action dated Jul. 12, 2018", 12 pgs.
"U.S. Appl. No. 13/727,364, Response filed Nov. 6, 2015 to Final Office Action dated Sep. 10, 2015", 10 pgs.
"European Application Serial No. 13835157.2, Extended European Search Report dated Apr. 25, 2016", 7 pgs.
"European Application Serial No. 13835157.2, Response filed Nov. 22, 2016 to Extended European Search Report dated Apr. 25, 2016", 16 pgs.
"European Application Serial No. 18167767.5, Extended European Search Report dated May 16, 2018", 6 pgs.
"International Application Serial No. PCT/US2013/048311, International Preliminary Report on Patentability dated Mar. 19, 2015", 7 pgs.
"International Application Serial No. PCT/US2013/048311, International Search Report dated Sep. 30, 2013", 4 pgs.
"International Application Serial No. PCT/US2013/048311, Written Opinion dated Sep. 30, 2013", 5 pgs.
Peter, Saint-Andre, "XEP-0153: vCard-Based Avatars", Retrieved from the Internet: <URL:http://www.xmpp.orgjextensionsjxep-0153.pdt [retrieved on Apr. 14, 2016], (Aug. 16, 2006), 12 pgs.
Qingshu, Yuan, et al., "A latency-adaptive communication architecture for inter-networked virtual environments", Systems, Man and Cybernetics, 2004 IEEE International Conference on, vol. 7, No. doi: 10.1109/ICSMC.2004.1401388, (Oct. 2004).

\* cited by examiner

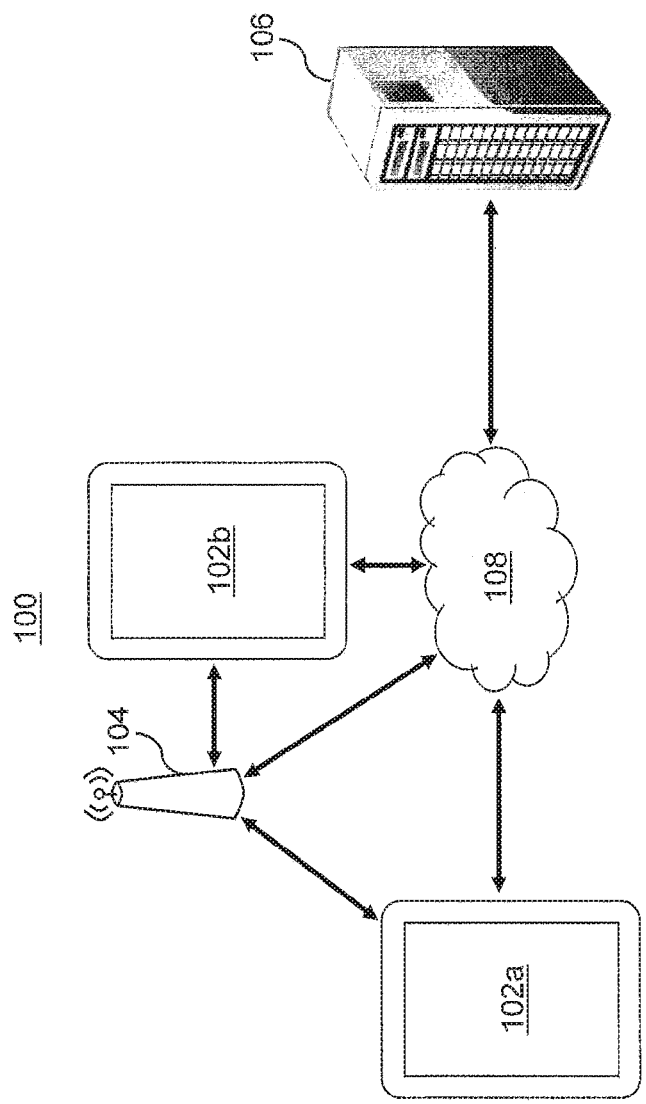

AVATAR REPRESENTATION OF USERS WITHIN PROXIMITY USING APPROVED AVATARS

CROSS-REFERENCE TO RELATED APPLICATION

This application claims priority and benefit to U.S. Provisional Patent Application No. 61/697,473, filed on Sep. 6, 2012, which is incorporated herein by reference in its entirety.

TECHNICAL FIELD

This disclosure relates generally to avatar representation of users, and in particular, to avatar representation of users within proximity using approved avatars.

BACKGROUND ART

Service platforms such as the Intel Connect Center (ICC) platform may be utilized to enable communication among users in a local area via their respective communication devices. For example, the ICC platform may enable discovery of communication devices within certain proximity. Dashboard applications on those communication devices may then present users of the communication devices as avatars (e.g., graphical representations of the users and/or characters of the users) to effectively alert the users of other users in the local area with whom they may interact. However, since users may typically customize their avatars, some of the presented avatars may include content that are offensive or otherwise inappropriate to one or more of the users, which may negatively impact the user experience of the offended users.

BRIEF DESCRIPTION OF THE DRAWINGS

FIG. 1 depicts a high-level functional block diagram of a system for facilitating avatar representation of users within proximity using approved avatars, in accordance with various aspects of the present disclosure.

DETAILED DESCRIPTION

Figure 2A:
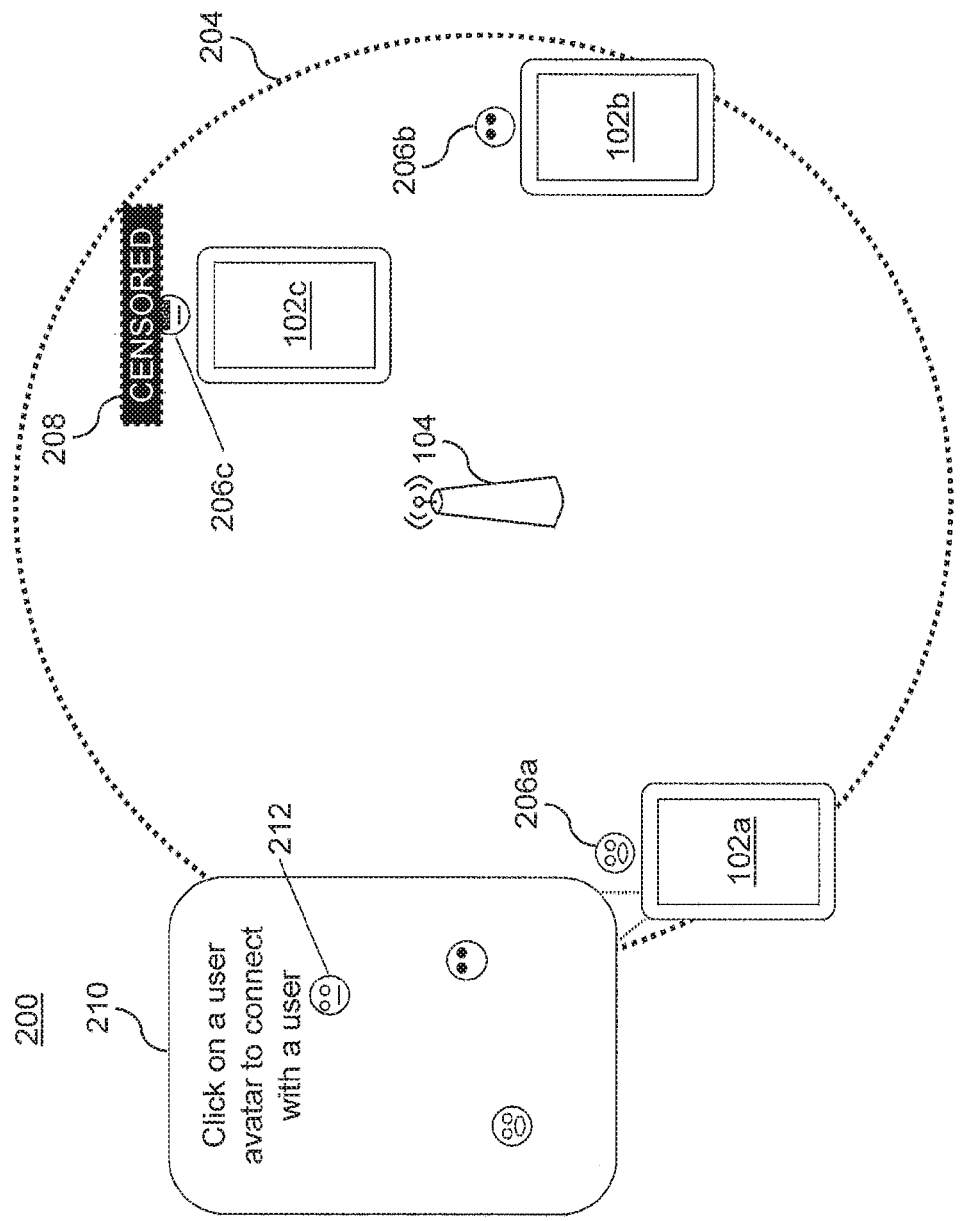
FIGS. 2A and 2B depict scenarios illustrating avatar representation of users within proximity using approved avatars, in accordance with various aspects of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, devices, systems, and/or methods for facilitating avatar representation of users within proximity using approved avatars are proposed. In one embodiment, an electronic device for facilitating avatar representation of users within proximity using approved avatars may include a memory unit, and logic configured to: determine communication devices that are within a proximity threshold, wherein the determined communication devices include first and second communication devices, the first communication device is associated with a first user, the second communication device is associated with a second user, the first user is associated with a first avatar, and the second user is associated with a second avatar; receive a request initiated at the first communication device for avatar information associated with one or more users of the determined communication devices; and provide the second avatar to the first user via the first communication device based on determining that the second avatar is included in an approved avatar set.

In another embodiment, a system for facilitating avatar representation of users within proximity using approved avatars may include communication devices associated with users and an electronic device that includes a memory unit and logic configured to: determine one or more of the communication devices that are within a proximity threshold, wherein the determined communication devices include first and second communication devices, the first communication device is associated with a first user, the second communication device is associated with a second user, the first user is associated with a first avatar, and the second user is associated with a second avatar; receive a request initiated at the first communication device for avatar information associated with one or More users of the determined communication devices; and provide the second avatar to the first user via the first communication device based on determining that the second avatar is included in an approved avatar set.

In another embodiment, a method for facilitating avatar representation of users within proximity using approved avatars may include: determining communication devices that are within a proximity threshold, wherein the determined communication devices include first and second communication devices, the first communication device is associated with a first user, the second communication device is associated with a second user, the first user is associated with a first avatar, and the second user is associated with a second avatar; receiving a request initiated at the first communication device for avatar information associated with one or more users of the determined communication devices; and providing the second avatar to the first user via the first communication device based on determining that the second avatar is included in an approved avatar set.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a," "an," and "the" include plural referents unless the context clearly dictates otherwise.

FIG. 1 depicts a high-level functional block diagram of a system 100 for facilitating avatar representation of users within proximity using approved avatars, in accordance with various aspects of the present disclosure. As illustrated, system 100 includes communication devices 102, a network access point 104, and a network server 106. It should be noted that communication devices 102 may represent any of a number of electronic and/or computing devices, both wireless and wired. As such, in some embodiments, communication devices 102 may comprise desktops, laptops, mobile devices, smart phones, gaming devices, tablet computers, and/or other devices.

Communication device 102 and/or other devices may communicate over network access point 104 and/or a communication network 108, for instance, to interact with a network server 106 or to perform other functions. It should be noted that the communication mechanisms and networks as described herein are not intended to be limiting in any way, as the communications could be based on one or more standards and protocols including, but not limited to, Ethernet, Wi-Fi, Wi-Fi Direct, Bluetooth, NFC, radio frequency, GSM, CDMA, GPRS, 3G or 4G (e.g., WiMAX, LTE, etc.) cellular standards, Wireless USB, satellite communication, infrared, sonar, etc., and communication network 108 may comprise the Internet or any other suitable network, such as peer-to-peer, intranets, extranets, etc. In one embodiment, communication network 108 may include network access point 104 to facilitate communication between communication device 102 and other devices within communication network 108. In some embodiments, network access point 104 and communication devices 102 may include short-range wireless devices that employ one or more short-range wireless standards and protocols (e.g., Wi-Fi, Wi-Fi Direct, Bluetooth, NFC, etc.), to facilitate communication among communication devices 102. By way of example, communication devices 102 may utilize Wi-Fi Direct to connect to one another without the need for a separate wireless access point (e.g., network access point 104).

In one embodiment, with respect to FIG. 1, an electronic device may determine communication devices 102 that are within a proximity threshold associated with a proximity of a first communication device 102 (e.g., device 102a, device 102b, etc.), a network access point 104, and/or other point. By way of illustration, the electronic device may determine that the first communication device 102 and a second communication device 102 are within the proximity threshold. The first communication device 102 may be associated with a first user and the second communication device 102 may be associated with a second user. The first user may be associated with a first avatar and the second user may be associated with a second avatar. The electronic device may determine a request initiated at the first communication device 102 for avatar information associated with one or more users of the determined communication devices 102. In response to the request, the electronic device may provide the second avatar to the first user via the first communication device 102 based on determining that the second avatar is included in an approved avatar set. For example, the second avatar may be provided to the first user by facilitating presentation of the second avatar to the first user via the first communication device 102. It should be noted that, in some embodiments, the electronic device may be the first communication device 102, the network server 106, and/or other devices.

Figure 2B:
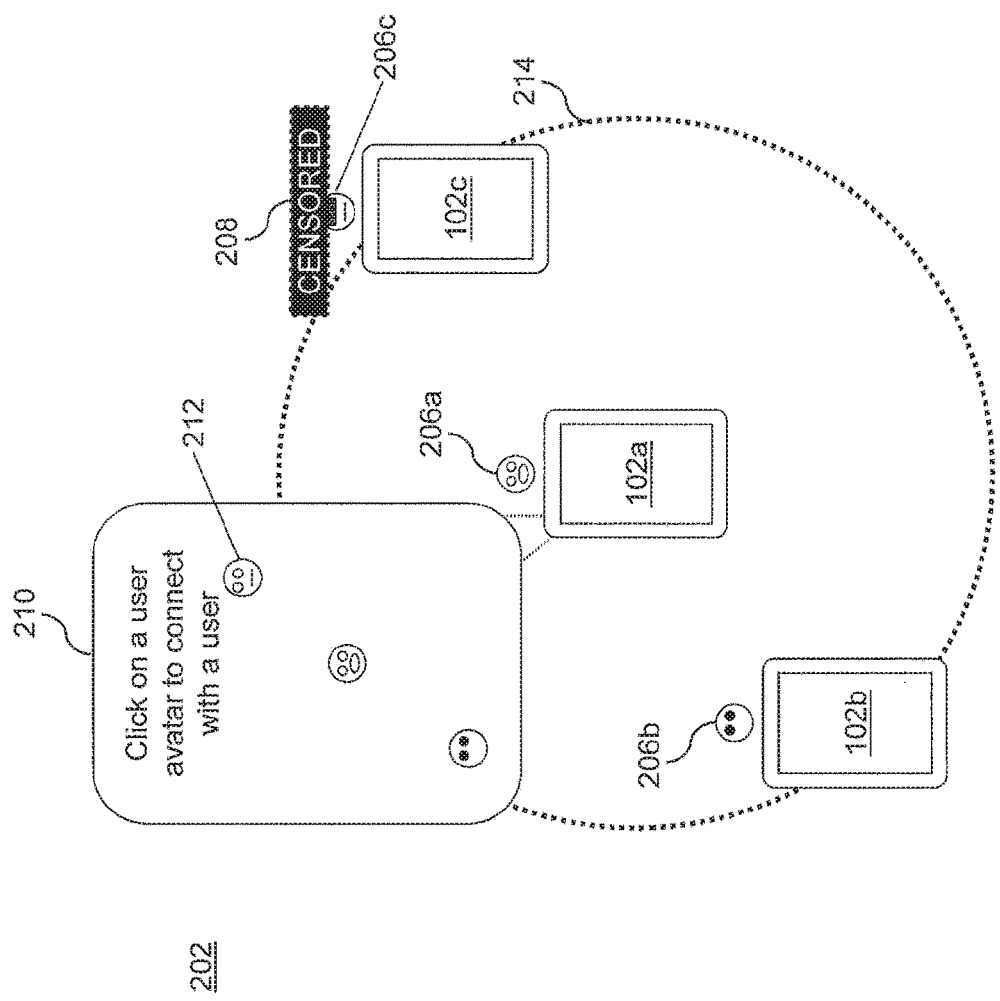

Along these lines, FIGS. 2A and 2B depict scenarios 200 and 202 illustrating avatar representation of users within proximity using approved avatars, in accordance with various aspects of the present disclosure. With respect to FIG. 2A, scenario 200 illustrates communication devices 102a, 102b, and 102c that are within a wireless connection range 204 of network access point 104. In one use case, network server 106 may determine that communication devices 102a, 102b, and 102c are within wireless connection range 204, for instance, via a discovery operation, Upon discovery, network server 106 may initiate a session exchange with each of communication devices 102a, 102b, and 102c. The session exchange may, for instance, include retrieving a username, status information, application identifiers of applications at the respective communication device 102, a hash of an avatar associated with a user of the respective communication device 102, and/or other information. Moreover, network server 106 may initiate an avatar exchange with a communication device 102 to update a user's avatar information. For example, when network server 106 receives the avatar hash from the communication device 102 during the session exchange, it may determine that the received avatar hash does not match the avatar hash stored at network server 106 for the user associated with the communication device 102. Such a determination may indicate that the user has changed his/her avatar information. Thus, network server 106 may sent a request to the communication device 102 to retrieve the user's updated avatar information from the communication device 102 and store the updated avatar information at network server 106.

In another use case, with respect to FIG. 2A, applications such as an application associated with a user interface 210 may be registered with network server 106. Registered applications may, for instance, receive updates relating to user information associated with users of the applications. The user information updates may, for instance, include updates to username, status information, avatar information (e.g., an avatar, a hash of the avatar, etc.), and/or other information. It should be noted that, in some embodiments, the updates that are received by applications at communication devices 102 may be based on user settings associated with users of communication devices 102. By way of example, applications at communication devices 102 of users that specify a desire to only be presented with approved avatars may only receive updated approved avatars. As such, in one embodiment, an application may not have access to an unapproved avatar if the user of the application has opted not to see unapproved avatars.

In a further use case, the applications may initiate requests for user information relating to users of communication devices 102 that are determined to be within wireless connection range 204. For example, in scenario 200, an application at communication device 102a may initiate a request for avatars associated with users of communication devices 102 within wireless connection range 204. As shown by FIG. 2A, the user of communication device 102a is associated with avatar 206a, the user of communication device 102b is associated with avatar 206b, and the user of communication device 102c is associated with avatar 206c. As depicted by inappropriate content indicator 208, avatar 206c may include content that is potentially offensive or otherwise inappropriate. Thus, avatar 206c may be an unapproved avatar that is not included in an approved avatar set, while avatars 206a and 206b may be approved avatars that are included in the approved avatar set. The approved avatar set may, for instance, be a set of avatars that have been approved by an administrator (e.g., to be family friendly, non-offensive, appropriate, etc.), a set of avatars that is packaged with a service platform associated with the application at communication device 102a, a set of avatars that are provided as an official update to the service platform, and/or other set of avatars that have been approved. In scenario 200, the user of communication device 102a may have specified a desire to avoid presentation of offensive or otherwise inappropriate avatars. As a result, in response to the avatar request, network server 106 may provide the application at communication device 102 with avatar 206b to represent the user of communication device 102b in user interface 210 and with an approved avatar 212 (in lieu of avatar 206c) from the approved avatar set to represent the user of communication device 102c in user interface 210.

With respect to FIG. 2B, scenario 202 illustrates communication devices 102a, 102b, and 102b that are within a wireless connection range 214 of communication device 102a. In addition to knowing such information about itself, communication device 102a may determine that communication devices 102b and 102c are within wireless connection range 214 via a discovery operation (e.g., using short-range wireless standards or protocols). Communication device 102a may then initiate a session exchange and/or an avatar exchange with each of communication devices 102b and 102c to retrieve user information (e.g., username, status information, an avatar associated with the user, a hash of the avatar, etc.) and/or other information from communication devices 102b and 102c.

As such, in one use case, when an application at communication device 102a initiates a request for avatars representing users of communication devices 102 within wireless connection range 214, avatars 206a, 206b, and 206c may already be stored at communication device 102a as associated with users of communication devices 102a, 102b, and 102c. As noted above, avatars 206a and 206b may be approved avatars that are included in an approved avatar set, while avatar 206c may be an unapproved avatar that is potentially offensive or otherwise inappropriate. The approved avatar set may, for instance, be a set of avatars that have been approved by an administrator (e.g., to be family friendly, non-offensive, appropriate, etc.), a set of avatars that is packaged with a service platform associated with the application at communication device 102a, a set of avatars that are provided as an official update to the service platform, and/or other set of avatars that have been approved. In scenario 202, the user of communication device 102a may have specified a desire to avoid presentation of offensive or otherwise inappropriate avatars. Thus, in response to the avatar request, communication device 102a may interact with the application to present the user of communication device 102a with avatar 206a and 206b to represent the users of communication devices 102a and 102b in user interface 210 and with approved avatar 212 (in lieu of avatar 206c) from the approved avatar set to represent the user of communication device 102c in user interface 210.

Figure 3:
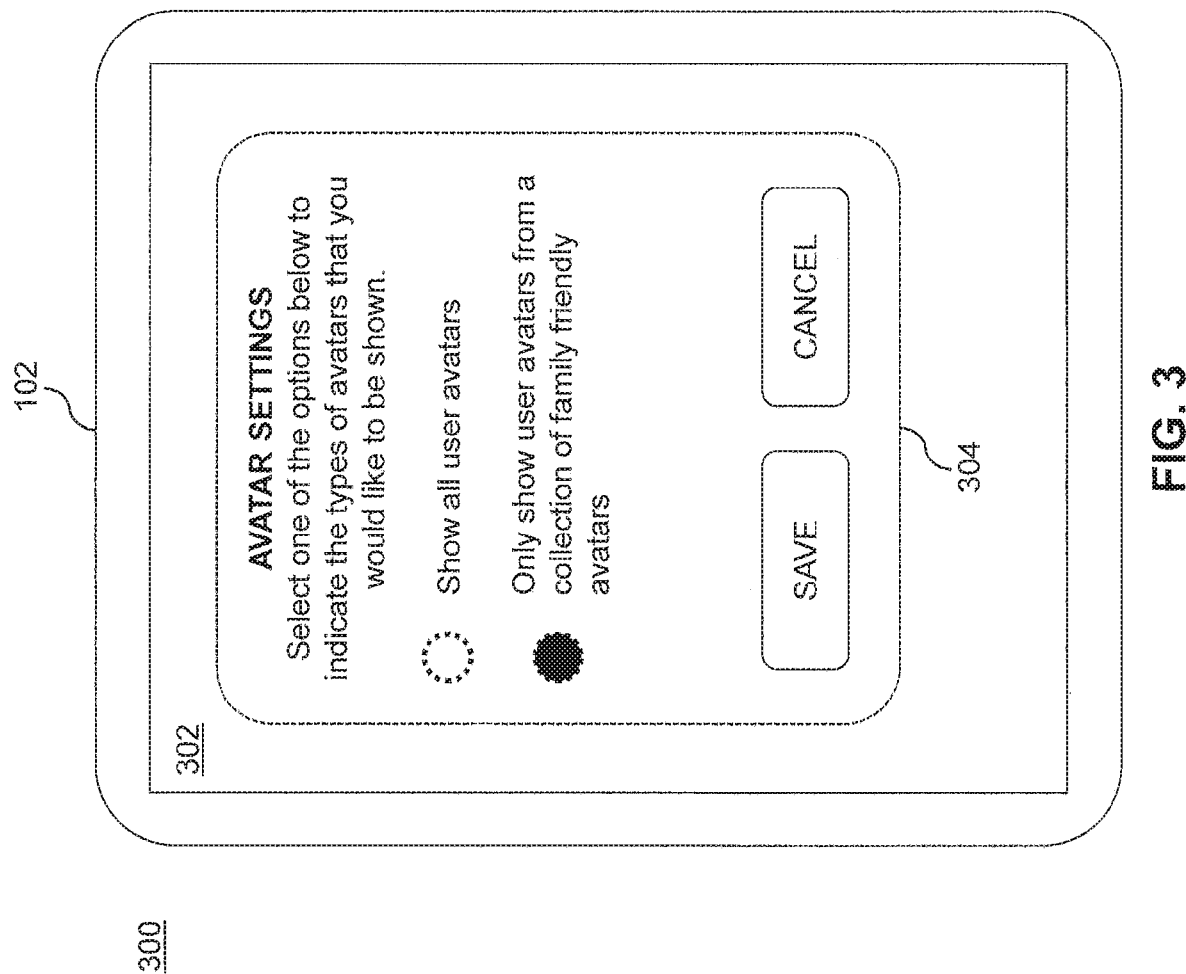
FIG. 3 depicts a scenario illustrating user configuration of avatar representation of users within proximity, in accordance with various aspects of the present disclosure.

As noted above, with respect to scenarios 200 and 202 of FIGS. 2A and 26, a user may specify a desire to avoid presentation of offensive or otherwise inappropriate avatars. For example, FIG. 3 depicts a scenario 300 illustrating user configuration of avatar representation of users within proximity, in accordance with various aspects of the present disclosure. In scenario 300, a user may utilize a user interface 302 to launch an avatar settings window 304 which enables the user to select presentation options associated with avatars. As depicted, the user has selected to only show user avatars from a collection of family friendly avatars, as opposed to showing all user avatars. As a result, avatars representing users of communication devices 102 within a proximity threshold (e.g., threshold associated with a proximity of a communication device 102, a network access point 104, and/or other point) that are included in the collection of family friendly avatars may be presented to the user, while avatars from the collection of family friendly avatars may be presented to the user in lieu of avatars representing those users that are not included in the collection of family friendly avatars. In this way, avatar representation of users within proximity using approved avatars may protect users from offensive or otherwise inappropriate content, improve user experience resulting therefrom, and/or provide other benefits.

In some embodiments, returning to FIG. 1, avatars may be associated with respective hashes to identify the avatars, to determine whether avatars are approved avatars via hash comparisons with hashes associated with an approved avatar set, and/or other purposes. As such, the first avatar of the first user may be associated with a first hash and the second avatar of the second user may be associated with a second hash. As discussed above, a request may be initiated at the first communication device 102 (that is utilized by the first user) for avatar information associated with one or more users of communication devices 102 determined to be within a proximity threshold (e.g., threshold associated with a proximity of a communication device 102, a network access point 104, and/or other point). Such determined communication devices 102 may, for instance, include the second communication device 102 that is utilized by the second user. The second avatar associated with the second user may be provided to the first user via the first communication device 102 based on the second avatar being included in an approved avatar set. For example, in one embodiment, the first communication device 102, network server 106, and/or other devices may determine that the second avatar is included in the approved avatar set based on determining that the second hash matches an approved hash associated with the approved avatar set (e.g., the second hash is the same as the approved hash, specific portions of the second hash are the same as the corresponding portions of the approved hash, etc.). The approved hash may, for instance, be a hash corresponding to a particular approved avatar in the approved avatar set, and the second avatar may be the particular approved avatar.

In some embodiments, the communication devices 102 determined to be within the proximity threshold may include a third communication device 102 associated with a third user. In one embodiment, the first communication device 102, network server 106, and/or other devices may provide an approved avatar from the approved avatar set, in lieu of the third avatar, to the first user via the first communication device 102 based on determining that a third avatar associated with the third user is not included in the approved avatar set. For example, as shown in FIGS. 2A and 2B, approved avatar 212 is presented in lieu of avatar 206c to the user of communication device 102a to represent the user of communication device 102c in user interface 210. In this way, the user of communication device 102a may be protected from the potentially offensive or otherwise inappropriate content of avatar 206c.

As noted above, in some embodiments, the first avatar of the first user may be associated with a first hash and the second avatar of the second user may be associated with a second hash. In addition, in one embodiment, the third avatar may be associated with a third hash. As discussed, the second avatar may be determined to be included in the approved avatar set based on determining that the second hash matches at least one approved hash associated with the approved avatar set. On the other hand, the third avatar may be determined to not be included in the approved avatar set based on determining that the third hash does not match at least one approved hash associated with the approved avatar set. Thus, in response to an avatar request initiated at the first communication device 102, the second avatar may be provided to the first user (e.g., to represent the second user) while an approved avatar may be provided in lieu of the third avatar to the first user (e.g., to represent the third user) based on determining that the second hash matches at least one approved hash and that the third hash does not match at least one approved hash.

Figure 4:
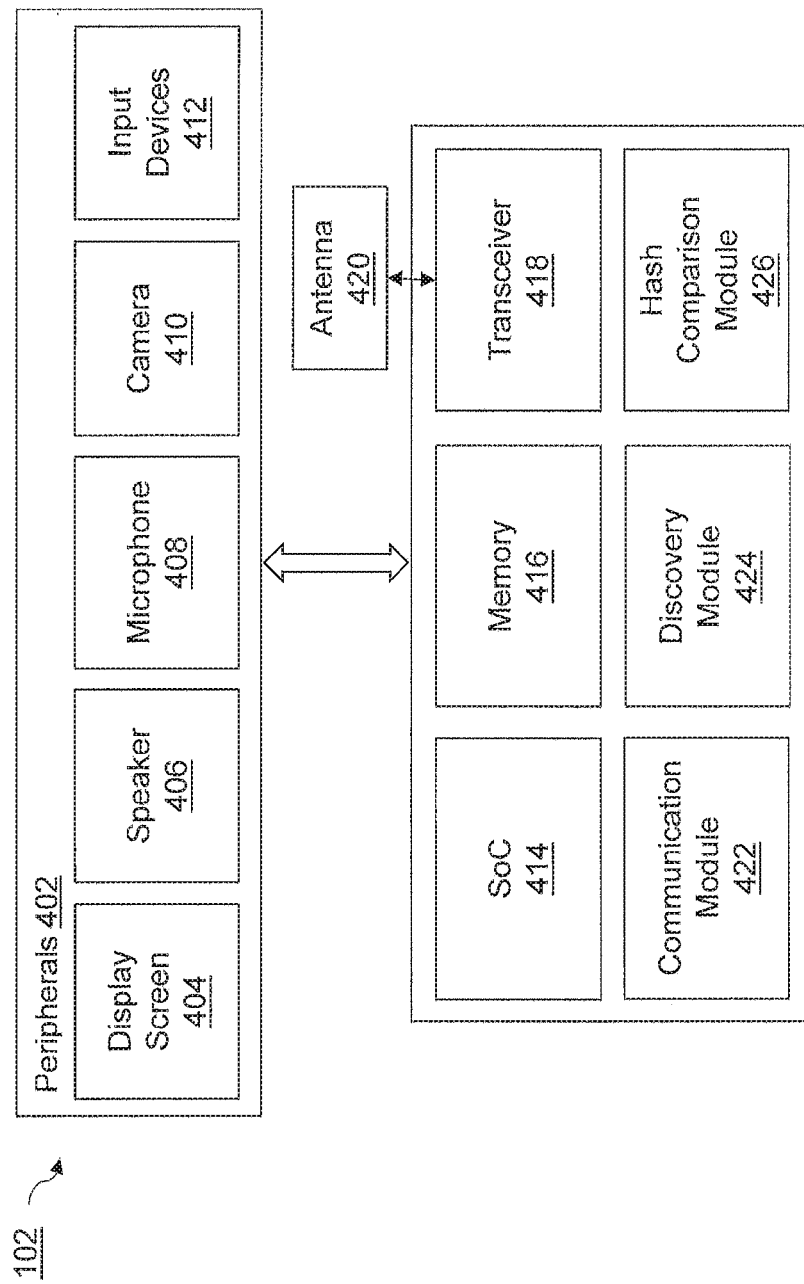
FIG. 4 depicts a high-level functional block diagram of a communication device, in accordance with various aspects of the present disclosure.

FIG. 4 illustrates a high-level functional block diagram of communication device 102, in accordance with various aspects of the present disclosure. As an example, communication device 102 may include a variety of peripheral components 402, such as, for example, display screen 404, speaker 406, microphone 408, camera 410, input devices 412, as well as a system-on-a-chip (SoC) 414, memory 416, a transceiver 418 (e.g., wireless transceiver), an antenna 420 (e.g., RF antenna), a communication module 422, a discovery module 424, a hash comparison module 426, and/or other components. Communication device 102 may, for instance, also include a bus infrastructure and/or other interconnection means to connect and communicate information between various components of communication device 102.

In some embodiments, SoC 414 may be part of a core processing or computing unit of communication device 102, and may be configured to receive and process input data and instructions, and to provide output and/or control other components of communication device 102, in accordance with embodiments of the present disclosure. SoC 414 may include a microprocessor, a memory controller, a memory and other components. The microprocessor may further include a cache memory (e.g., SRAM), which along with the memory of SoC 414 may be part of a memory hierarchy to store instructions and data. The microprocessor may also include one or more logic modules such as a field programmable gate array (FPGA) or other logic array. Communication between the SoC 414's microprocessor and memory may be facilitated by the memory controller (or chipset), which may also facilitate communication with peripheral components 402.

Memory 416 may be a dynamic storage device coupled to the bus infrastructure and configured to store information, instructions, and programs (e.g., such as applications integrated with software modules of communication device 102) to be executed by processors of SoC 414 and/or other processors (or controllers) associated with communication device 102. Some of all of memory 416 may be implemented as Dual In-line Memory Modules (DIMMs), and may be one or more of the following types of memory: Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device. Communication device 102 may also include read only memory (ROM) and/or other static storage devices coupled to the bus infrastructure and configured to store static information and instructions for processors of SoC 414 and/or other processors (or controllers) associated with communication device 102.

Transceiver 418 may be configured to transmit and receive signals. For example, transceiver 418 may be a wireless transceiver that includes a transmitter and a receiver for transmitting and receiving wireless signals (e.g., via antenna 420). The transmitter and the receiver may, for instance, be combined and share common circuitry or a single housing. Communication module 422 may utilize the transceiver to transmit and receive messages. Moreover, communication module 422 may perform initially processing of the messages to determine where the messages are to be forwarded and/or how those messages should be further processed.

Discovery module 424 may be configured to discover other communication devices 102 that are in the local area (e.g., within a proximity of a communication device 102, a network access point 104, and/or other point). Discovery module 424 may, for instance, utilize short-range standards or protocols, such as Wi-Fi, Wi-Fi Direct, Bluetooth, NFC, etc.) to discover the other communication devices in the local area. Discover module 424 may also utilize information from other sources, such as network access point 104, network server 106, etc., to discover communication devices that are in the local area.

Hash comparison module 426 may be configured to determine whether an avatar associated with a user of a discovered communication device is included in an approved avatar set. For example, hash comparison module 426 may compare a hash (e.g., computed by hash comparison module 426 or otherwise obtained by other means) corresponding to the avatar to a set of hashes associated with the approved avatar set. If, for instance, the hash corresponding to the avatar matches at least one of the hashes in the hash set, the avatar may be determined to be an approved avatar of the approved avatar set. On the other hand, if the has corresponding to the avatar does not match at least one of the hashes in the hash set, the avatar may be determined to be an unapproved avatar that is not included in the approved avatar set.

Figure 5:
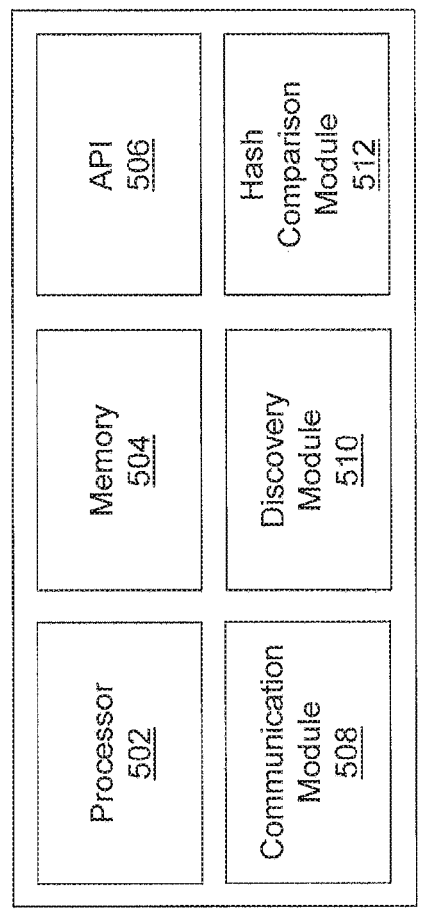
FIG. 5 depicts a high-level functional block diagram of a network server, in accordance with various aspects of the present disclosure.

FIG. 5 depicts a high-level functional block diagram of network server 106, in accordance with various aspects of the present disclosure. As an example, network server 106 may include processor 502, memory 504, API 506, a communication module 508, a discovery module 510, a hash comparison module 512, and/or other components. It should be noted that, in some embodiments, network server 106 may include components that are the same as or similar to components of communication device 102 as shown in FIG. 4, as well as one or more other components, to facilitate avatar representation of users within proximity using approved avatars.

By way of example, processor 502 and memory 504 may perform the same or similar functions as SoC 414 and memory 416 of FIG. 4 as described above. In addition, communication module 508, discovery module 510, and hash comparison module 512 may perform the same or similar functions as communication module 422, discovery module 424, and hash comparison module 426 of FIG. 4 as described above. It should also be noted that while networks server 106 may include components that are the same or similar to components of communication device 102, those components as well as other components may be configured for network server operations. For example, processing and storage capabilities associated with processor 502 and memory 504 may be greater than processing and storage capabilities associated with SoC 414 and memory 416.

Furthermore, API 506 may be configured to enable developers (e.g., independent software vendors (ISVs)) to develop applications for interacting with a service platform associated with network server 106. In some embodiments, applications may initiate API calls defined by API 506 to interact with one or more other applications, communication devices 102, network access point 104, network service 106, etc.

Figure 6:
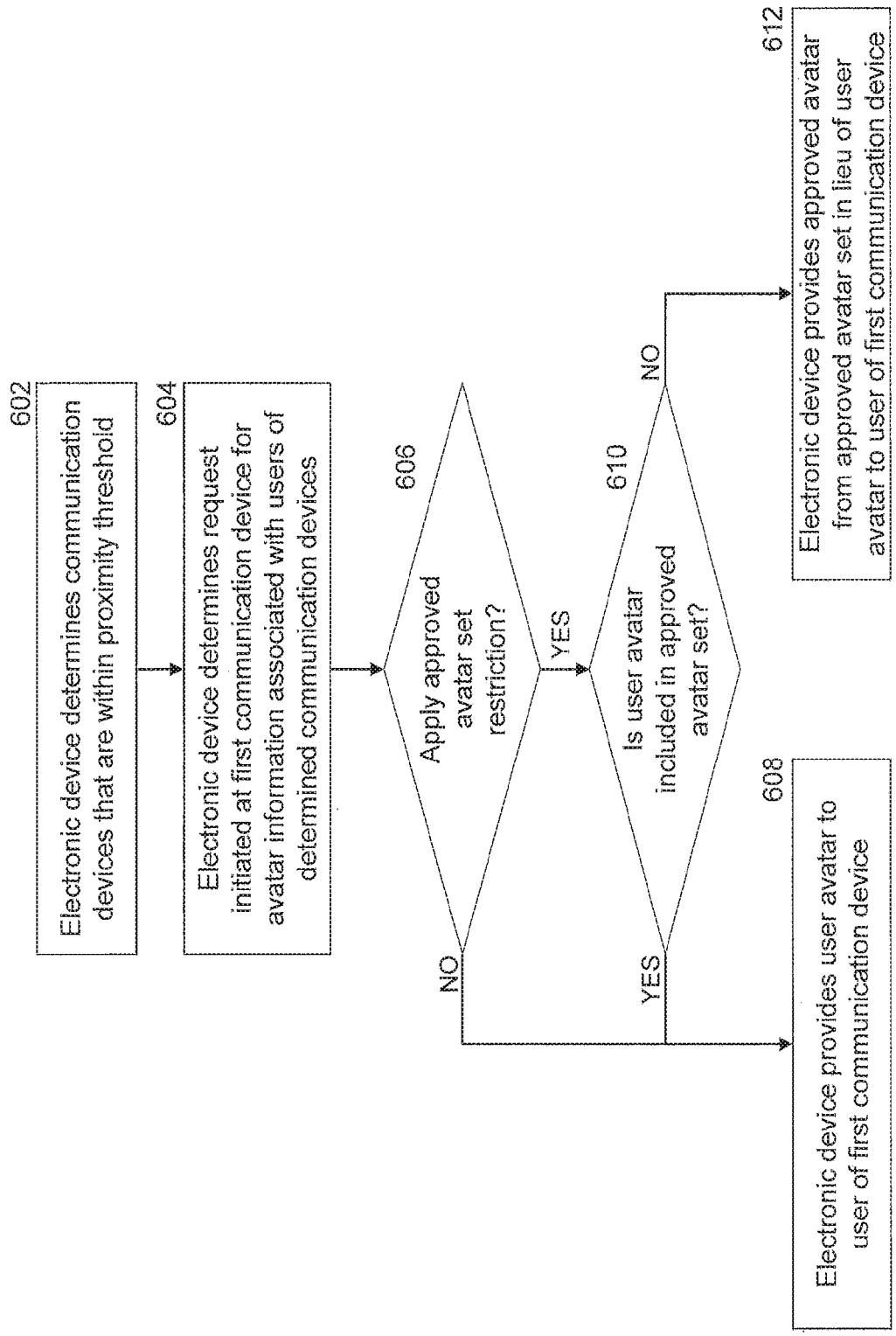
FIG. 6 depicts a high-level flow diagram of a process for facilitating avatar representation of users within proximity using approved avatars, in accordance with various aspects of the present disclosure.

FIG. 6 depicts a high-level flow diagram of a process for facilitating avatar representation of users within proximity using approved avatars, in accordance with various aspects of the present disclosure. It should be noted that the process of FIG. 6 is intended to be illustrative. In some embodiments, the process of FIG. 6 may be occur with one or more additional blocks not described, and/or without one or more of the blocks discussed. Additionally, the order with respect to the process that is illustrated in FIG. 6 and described below is not intended to be limiting. With such understanding in mind, in block 602, an electronic device may determine communication devices 102 that are within a proximity threshold. The proximity threshold may, for instance, be associated with a proximity of a given communication device 102, network access point 104, and/or other point. As discussed above, in some embodiments, the electronic device may be one of the determined communication devices 102, network server 106, and/or other device.

In block 604, the electronic device may determine a request initiated at a first communication device 102 that is determined to be within the proximity threshold. Upon processing of the request, the electronic device may determine that the request is for avatar information associated with one or more users of the communication devices 102 determined to be within the proximity threshold (e.g., second and third communication devices 102).

In block 606, the electronic device may determine whether user avatars provided to the user of the first communication device 102 should be restricted to approved avatars associated with an approved avatar set. For example, if the user of the first communication device 102 has specified that such a restriction should not be applied (e.g., by selecting an option to allow all avatars to be presented), the process of FIG. 6 may proceed to block 608. In block 608, one or more user avatars associated with the users of the communication devices 102 that are determined to be within the proximity threshold may be provided to the user of the first communication device 102. For example, the user avatars may be provided to the user of the first communication device 102 by presenting the user avatars to the user via a user interface of the first communication device 102.

On the other hand, with respect to block 606, if the user of the first communication device 102 has specified that such a restriction should be applied (e.g., by selecting an option to prohibit presentation of unapproved avatars), the process of FIG. 6 may proceed to block 610. In block 610, the electronic device may determine for each of the user avatars associated with the users of the determined communication devices 102 whether the user avatar is included in an approved avatar set. For example, a user avatar may be determined to be an approved avatar of the approved avatar set if a hash corresponding to the user avatar matches a hash corresponding to one of the approved avatars of the approved avatar set. If, for instance, the user avatar is determined to be included in the approved avatar set, the process of FIG. 6 may proceed to block 608 to provide the user avatar to the user of the first communication device 102. Otherwise, the process of FIG. 6 may proceed to block 612.

In block 612, the electronic device may provide one of the approved avatars from the approved avatar set in lieu of the user avatar to the user of the first communication device 102. For example, instead of utilizing the user avatar to represent the user associated with the user avatar, the approved avatar may be utilized by an application of the first communication device 102 to represent the user associated with the user avatar to the user of the first communication device 102.

Figure 7:
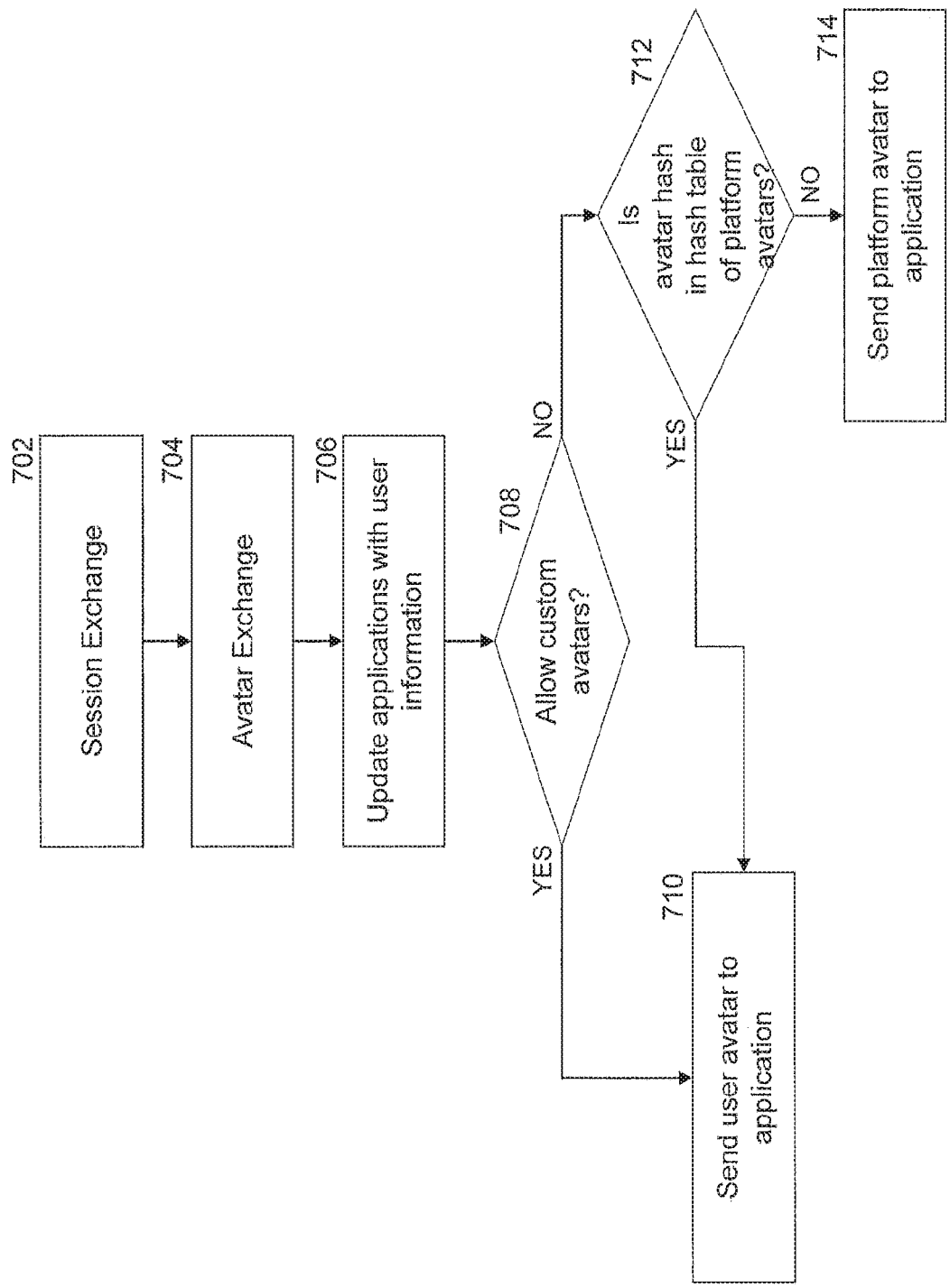
FIG. 7 depicts a high-level flow diagram of a process for facilitating avatar representation of users using service platform avatars, in accordance with various aspects of the present disclosure.

FIG. 7 depicts a high-level flow diagram of a process for facilitating avatar representation of users using service platform avatars, in accordance with various aspects of the present disclosure. It should be noted that the process of FIG. 7 is intended to be illustrative. In some embodiments, the process of FIG. 7 may be occur with one or more additional blocks not described, and/or without one or more of the blocks discussed. Additionally, the order with respect to the process that is illustrated in FIG. 7 and described below is not intended to be limiting. With such understanding in mind, in block 702, a session exchange may be initiated with one or more communication devices 102. For example, the session exchange may be initiated with communication devices 102 that are determined to be within a proximity threshold (e.g., threshold associated with a proximity of a communication device 102, a network access point 104, and/or other point). The session exchange may include retrieving a username, status information, application identifiers of applications at the respective communication device 102, a hash of an avatar associated with a user of the respective communication device 102, and/or other information.

In block 704, an avatar exchange may be initiated with at least one of the communication devices 102 to update a user's avatar information. For example, an avatar hash that is received from the communication device 102 during the session exchange may not match a stored avatar hash (e.g., stored at network server 106, communication device 102, etc.) that correspond to a user avatar of the user of the communication device. The mismatch may, for instance, indicate that the user has changed his/her avatar information. Thus, a request may be sent to the communication device 102 to retrieve the user's updated avatar information from the communication device 102 and store the updated avatar information.

In block 706, applications may be updated with new and/or modified user information. The user information may include username, status information, avatar information (e.g., an avatar, a hash of the avatar, etc.), and/or other information. It should be noted that, in some embodiments, the updates that are received by applications at communication devices 102 may be based on user settings associated with users of communication devices 102. By way of example, applications at communication devices 102 of users that specify a desire to only be presented with approved avatars may only receive updated approved avatars. As such, in one embodiment, an application may not have access to an unapproved avatar if the user of the application has opted not to see unapproved avatars.

For example, as indicated in block 708, a user of a communication device 102 may specify whether custom avatars (as opposed to generic service platform avatars) may be presented to the user. If, for instance, the user allows custom avatars, the process of FIG. 7 may proceed to block 710 where a user avatar may be sent to the application at the communication device 102 without needing to check to see if the user avatar is a custom avatar.

On the other hand, if the user does not allow custom avatars, the process of FIG. 7 may proceed to block 712 where the corresponding hash of the user avatar is checked against a hash table associated with service platform avatars (e.g., official service platform avatars). If the corresponding hash is determined to be in the hash table (e.g., there is a match), the user avatar is sent to the application at the communication device 102 (as shown by block 710). However, if there corresponding hash is not in the hash table (e.g., no match was found), one of the service platform avatars may be sent to the application at the communication device 102 to represent the user of the communication device 102 in lieu of the user avatar (as shown by block 714).

By virtue of the disclosed configurations and processes, with respect to representing users in proximity using approved avatars, a number of benefits are achieved. Some of these benefits may, for instance, include protection from offensive or otherwise inappropriate content, improved user experience resulting therefrom, and/or other benefits.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested by this disclosure, and are within the spirit and scope of the exemplary aspects of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative, embodiment" in various portions of this specification are not necessarily all referring to the same embodiment. Furthermore, the particular features, structures or characteristics may be combined as suitable in one or more embodiments of the present disclosure. In addition, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Furthermore, the recited order of method, processing elements, or sequences, or the use of numbers, letters, or other designations therefore, is not intended to limit the claimed processes and methods to any order except as can be specified in the claims. Although the above disclosure discusses through various examples what is currently considered to be a variety of useful aspects of the disclosure, it is to be understood that such detail is solely for that purpose, and that the appended claims are not limited to the disclosed aspects, but, on the contrary, are intended to cover modifications and equivalent arrangements that are within the spirit and scope of the disclosed aspects.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. An electronic device comprising:
a processor; and
memory coupled to the processor, the memory including instructions that, when executed by the processor, cause the processor to:
identify a communication device that is within a proximity threshold, wherein the communication device is associated with an avatar corresponding to a user;
receive a hash associated with the avatar;
determine whether the received hash matches one of a plurality of stored hashes at the electronic device in response to a determination that the user of the electronic device has opted not to see unapproved avatars, the received hash corresponding to an unapproved image representation of the avatar, and the plurality of stored hashes corresponding to a set of approved avatar images;
responsive to a determination that the received hash does not match any of the plurality of stored hashes, provide an approved image representation of an approved avatar from the set of approved avatar images for display at the electronic device, the approved image representation of the approved avatar from the set of approved avatar images used to represent the user of the communication device instead of the unapproved image representation of the avatar, and wherein the unapproved image representation of the avatar is not used and is not displayed; and
permitting the user of the communication device to interact with the electronic device by causing display, at the electronic device, of the approved image representation of the approved avatar from the set of approved avatar images to represent the user of the communication device while prohibiting display of the unapproved image representation of the avatar, at the electronic device.

2. The electronic device of claim 1, wherein the electronic device comprises a network server.

3. The electronic device of claim 1, wherein the processor is further caused to identify that a second communication device is within the proximity threshold, the second communication device associated with a second avatar associated with a second hash and wherein the processor is further caused to determine whether the second hash matches any of the plurality of stored hashes corresponding to the set of approved avatar images.

4. The electronic device of claim 3, wherein when the second hash matches one of the plurality of stored hashes, the processor is further to cause an image representation of the second avatar to be displayed.

5. The electronic device of claim 1, wherein the proximity threshold is associated with a proximity of one or more of a network access point or the communication device, and the proximity is associated with a wireless connection range associated with one or more of the network access point or the communication device.

6. The electronic device of claim 1, wherein the electronic device further comprises a display configured to display the approved image representation of the approved avatar from the set of approved avatar images in response to the processor causing the display of the approved image representation of the approved avatar from the set of approved avatar images.

7. The electronic device of claim 1, wherein the processor is further caused to initiate a session exchange with the communication device in response to identifying that the communication device is within the proximity threshold.

8. A method performed by a processor of an electronic device, the method comprising:
using the processor, identifying a communication device that is within a proximity threshold, wherein the communication device is associated with an avatar corresponding to a user;
receiving a hash associated with the avatar;
determining, using the processor, whether the received hash matches one of a plurality of stored hashes at the electronic device in response to a determination that the user of the electronic device has opted not to see unapproved avatars, the received hash corresponding to an unapproved image representation of the avatar, and the plurality of stored hashes corresponding to a set of approved avatar images;
responsive to a determination that the received hash does not match any of the plurality of stored hashes, providing an approved image representation of an approved avatar from the set of approved avatar images for display at the electronic device, the approved image representation of the approved avatar from the set of approved avatar images used to represent the user of the communication device instead of the unapproved image representation of the avatar, and wherein the unapproved image representation of the avatar is not used and is not displayed; and
permitting the user of the communication device to interact with the electronic device by causing display, at the electronic device, of the approved image representation of the approved avatar from the set of approved avatar images to represent the user of the communication device while prohibiting display of the unapproved image representation of the avatar.

9. The method of claim 8, further comprising:
identifying that a second communication device is within the proximity threshold, the second communication device associated with a second avatar associated with a second hash; and
determining whether the second hash matches any of the plurality of stored hashes corresponding to the set of approved avatar images.

10. The method of claim 9, wherein when the second hash matches one of the plurality of stored hashes, further comprising providing an image representation of the second avatar for display at the electronic device.

11. The method of claim 8, wherein the proximity threshold is associated with a proximity of one or more of a network access point or the communication device, and the proximity is associated with a wireless connection range associated with one or more of the network access point or the communication device.

12. The method of claim 8, further comprising initiating a session exchange with the communication device in response to identifying that the communication device is within the proximity threshold.

13. At least one non-transitory machine-readable medium including communication instructions, which when executed by a processor of an electronic device, cause the processor to:
identify a communication device that is within a proximity threshold, wherein the communication device is associated with an avatar corresponding to a user;
receive a hash associated with the avatar;
determine whether the received hash matches one of a plurality of stored hashes at the electronic device in response to a determination that the user of the electronic device has opted not to see unapproved avatars, the received hash corresponding to an unapproved image representation of the avatar, and the plurality of stored hashes corresponding to a set of approved avatar images;
responsive to a determination that the received hash does not match any of the plurality of stored hashes, provide an approved image representation of an approved avatar from the set of approved avatar images for display at the electronic device, the approved image representation of the approved avatar from the set of approved avatar images used to represent the user of the communication device instead of the unapproved image representation of the avatar, and wherein the unapproved image representation of the avatar is not used and is not displayed; and
permitting the user of the communication device to interact with the electronic device by causing display, at the electronic device, of the approved image representation of the approved avatar from the set of approved avatar images to represent the user of the communication device while prohibiting display of the unapproved image representation of the avatar, at the electronic device.

14. The at least one machine-readable medium of claim 13, wherein the instructions further cause the processor to identify that a second communication device is within the proximity threshold, the second communication device associated with a second avatar associated with a second hash and wherein the processor is further caused to determine whether the second hash matches any of the plurality of stored hashes corresponding to the set of approved avatar images.

15. The at least one machine-readable medium of claim 14, wherein when the second hash matches one of the plurality of stored hashes, the instructions further cause the processor to provide an image representation of the second avatar for display at the electronic device.

16. The at least one machine-readable medium of claim 13, wherein the proximity threshold is associated with a proximity of one or more of a network access point or the communication device, and the proximity is associated with a wireless connection range associated with one or more of the network access point or the communication device.

17. The at least one machine-readable medium of claim 13, wherein the instructions further cause the processor to initiate a session exchange with the communication device in response to identifying the communication device is within the proximity threshold.

\* \* \* \* \*